US011205922B2

(12) United States Patent
Hung et al.

(10) Patent No.: US 11,205,922 B2
(45) Date of Patent: Dec. 21, 2021

(54) SYSTEM AND METHOD TO INCREASE A HOLD UP TIME OF A POWER SUPPLY UNIT

(71) Applicant: DELL PRODUCTS, LP, Round Rock, TX (US)

(72) Inventors: Tsai-Fu Hung, New Taipei (TW); Rita Joy F. Miranda, New Taipei (TW); Shih-Chieh Wang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/786,689

(22) Filed: Feb. 10, 2020

(65) Prior Publication Data

US 2020/0244099 A1    Jul. 30, 2020

Related U.S. Application Data

(62) Division of application No. 15/585,979, filed on May 3, 2017, now Pat. No. 10,622,832.

(51) Int. Cl.
| *H02J 9/06* | (2006.01) |
| *H02M 1/10* | (2006.01) |
| *H02J 7/00* | (2006.01) |
| *H02M 3/335* | (2006.01) |

(52) U.S. Cl.
CPC .............. *H02J 9/061* (2013.01); *H02M 1/10* (2013.01); *H02J 7/0068* (2013.01); *H02M 3/33584* (2013.01)

(58) Field of Classification Search
CPC ....................................................... H02J 9/061

USPC .......................................................... 307/65
See application file for complete search history.

(56) References Cited

U.S. PATENT DOCUMENTS

| 7,436,950 | B2 | 10/2008 | Chheda et al. |
| 8,037,354 | B2 | 10/2011 | Majewski et al. |
| 9,438,038 | B1 * | 9/2016 | Quaife ..................... H02J 7/345 |
| 9,690,349 | B2 | 6/2017 | Muccini et al. |
| 2002/0071300 | A1 | 6/2002 | Jang et al. |
| 2010/0220420 | A1 * | 9/2010 | Wang ................... H01L 27/0259 |
| | | | 361/90 |
| 2011/0175590 | A1 | 7/2011 | Yu et al. |
| 2012/0020131 | A1 | 1/2012 | Chan et al. |
| 2012/0026759 | A1 | 2/2012 | Balakrishnan et al. |
| 2012/0026763 | A1 | 2/2012 | Humphrey et al. |
| 2012/0159202 | A1 | 6/2012 | Xu et al. |

(Continued)

*Primary Examiner* — Adi Amrany
(74) *Attorney, Agent, or Firm* — Larson Newman, LLP

(57) ABSTRACT

A multiple power supply system includes first and second power supply units. The first power supply unit provides a main output voltage while in a normal mode of operation. The first power supply unit includes a first bulk capacitor, and first standby power circuitry. The first standby power circuitry provides a standby voltage while the first power supply unit is in the normal mode of operation. The second power supply unit provides the main output voltage while in the normal mode of operation. The first power supply unit includes a second bulk capacitor, and second standby power circuitry. The second standby power circuitry provides the standby voltage while the first power supply unit is in the normal mode of operation, and enables reverse charging of the second bulk capacitor by the first power supply unit while the second power supply unit is in a reverse charging mode of operation.

13 Claims, 8 Drawing Sheets

(56) References Cited

U.S. PATENT DOCUMENTS

| | | |
|---|---|---|
| 2012/0161522 A1 | 6/2012 | Nam |
| 2012/0176066 A1* | 7/2012 | Lin ........................ H05B 45/44 315/307 |
| 2012/0319488 A1 | 12/2012 | Yu et al. |
| 2013/0127248 A1 | 5/2013 | Lai |
| 2014/0368179 A1 | 12/2014 | Lee et al. |
| 2015/0005976 A1 | 1/2015 | Akebono et al. |
| 2015/0236587 A1 | 8/2015 | Kim et al. |
| 2015/0277530 A1 | 10/2015 | Rathnakar et al. |
| 2016/0116957 A1 | 4/2016 | Chen et al. |
| 2016/0344297 A1 | 11/2016 | Lee |
| 2017/0031402 A1 | 2/2017 | Muccini et al. |
| 2017/0031410 A1 | 2/2017 | Muccini et al. |

\* cited by examiner

SYSTEM AND METHOD TO INCREASE A HOLD UP TIME OF A POWER SUPPLY UNIT

CROSS-REFERENCE TO RELATED APPLICATION

This application is a divisional of U.S. patent application Ser. No. 15/585,979 entitled "System and Method to Increase a Hold Up Time of a Power Supply Unit," filed on May 3, 2017, the disclosure of which is hereby expressly incorporated by reference in its entirety.

FIELD OF THE DISCLOSURE

The present disclosure generally relates to information handling systems, and more particularly relates to increasing a hold up time of a power supply unit.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A multiple power supply system includes first and second power supply units. The first power supply unit may provide a main output voltage while in a normal mode of operation. The first power supply unit includes a first bulk capacitor, and first standby power circuitry. The first standby power circuitry may provide a standby voltage while the first power supply unit is in the normal mode of operation. The second power supply unit may provide the main output voltage while in the normal mode of operation. The second power supply unit includes a second bulk capacitor, and second standby power circuitry. The second standby power circuitry may provide the standby voltage while the first power supply unit is in the normal mode of operation, and may enable reverse charging of the second bulk capacitor by the first power supply unit while the second power supply unit is in a reverse charging mode of operation. The first power supply may represent a group of power supply operating in parallel.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
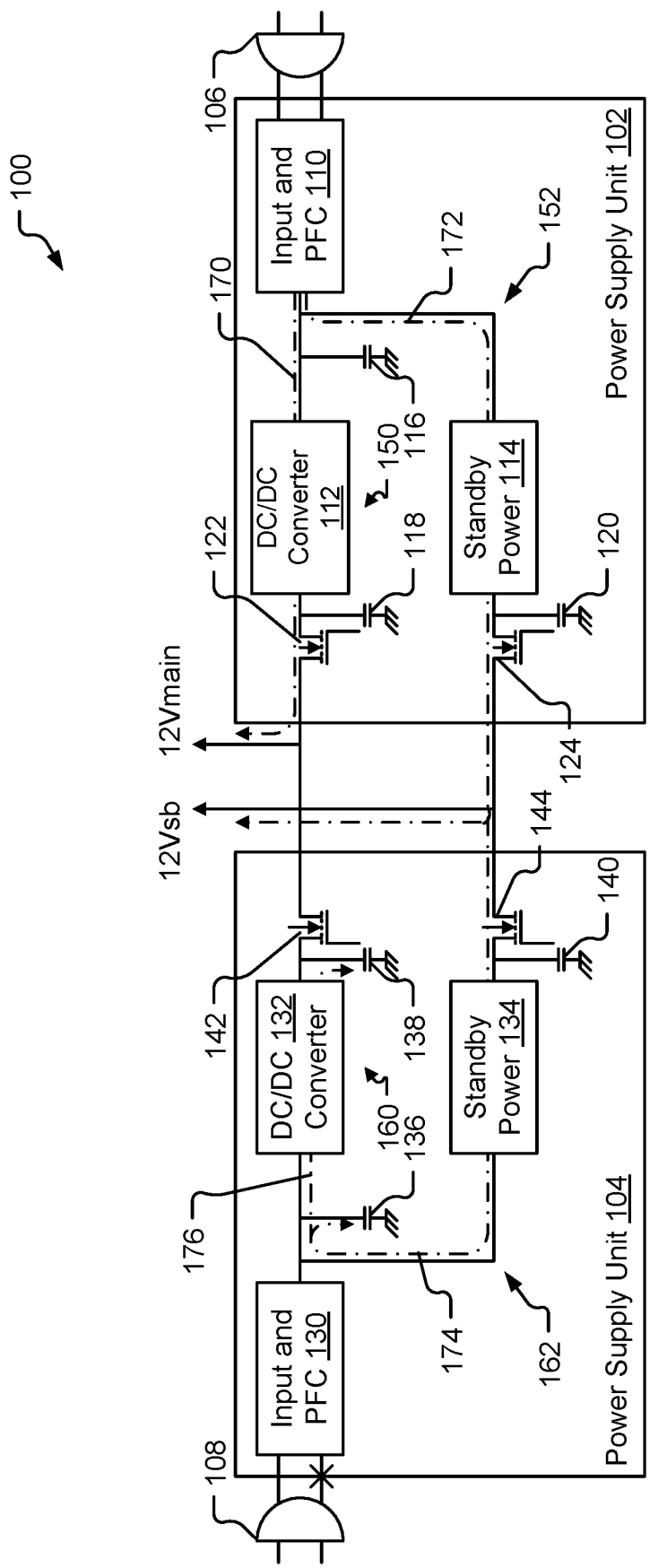
FIG. 1 is a schematic and block diagram of a dual power supply system in which charging energy comes from a standby power rail via standby power circuitry when one of power supply units input voltage is lost according to at least one embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

FIGS. 1-4 show a power supply system 100 for an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more buses operable to transmit communications between the various hardware components.

The power supply system 100 includes power supply units 102 and 104. The power supply unit 102 receives an alternating current (AC) input voltage from an input voltage source 106, and the power supply unit 104 receives an AC input voltage from an input voltage source 108. The power supply unit 102 includes input and power factor correction circuitry 110, a direct current to direct current (DC/DC) converter 112, standby power circuitry 114, capacitors 116, 118, and 120, and transistors 122 and 124. The power supply unit 104 includes input and power factor correction circuitry 130, a DC/DC converter 132, standby power circuitry 134, capacitors 136, 138, and 140, and transistors 142 and 144.

The input and power factor correction circuitry 110 includes first and second input terminals coupled to the AC input voltage source 106, and an output terminal. The DC/DC converter 112 includes an input terminal coupled to the output terminal of the input and power correction circuitry 110. The standby power circuitry 114 includes an input terminal coupled to the output terminal of the input and power factor correction circuitry 110, and an output terminal. The capacitor 116 includes a first terminal coupled to the output terminal of the input and power factor correction circuitry 110, and a second terminal coupled to a ground voltage reference. The capacitor 118 includes a first terminal coupled to the output terminal of the DC/DC converter 112, and a second terminal coupled to the ground voltage reference. The capacitor 120 includes a first terminal coupled to the output terminal of standby power circuitry 114, and a second terminal coupled to the ground voltage reference.

The or'ing transistor 122 includes a first current electrode coupled to the output terminal of the DC/DC converter 112, a second current electrode coupled to an output voltage terminal, 12Vmain, and a control terminal. The or'ing transistor 124 includes a first current electrode coupled to the output terminal of the standby power circuitry 114, a second current electrode coupled to a standby voltage terminal, 12Vsb, and a control terminal.

The input and power factor correction circuitry 130 includes first and second input terminals coupled to the AC input voltage source 108, and an output terminal. The DC/DC converter 132 includes an input terminal coupled to the output terminal of the input and power correction circuitry 130. The standby power circuitry 134 includes an input terminal coupled to the output terminal of the input and power factor correction circuitry 130, and an output terminal. The capacitor 136 includes a first terminal coupled to the output terminal of the input and power factor correction circuitry 130, and a second terminal coupled to a ground voltage reference. The capacitor 138 includes a first terminal coupled to the output terminal of the DC/DC converter 132, and a second terminal coupled to the ground voltage reference. The capacitor 140 includes a first terminal coupled to the output terminal of standby power circuitry 134, and a second terminal coupled to the ground voltage reference.

The or'ing transistor 142 includes a first current electrode coupled to the output terminal of the DC/DC converter 132, a second current electrode coupled to the output voltage terminal, 12Vmain, and a control terminal. The or'ing transistor 144 includes a first current electrode coupled to the output terminal of the standby power circuitry 134, a second current electrode coupled to the standby voltage terminal, 12Vsb, and a control terminal.

Figure 2:
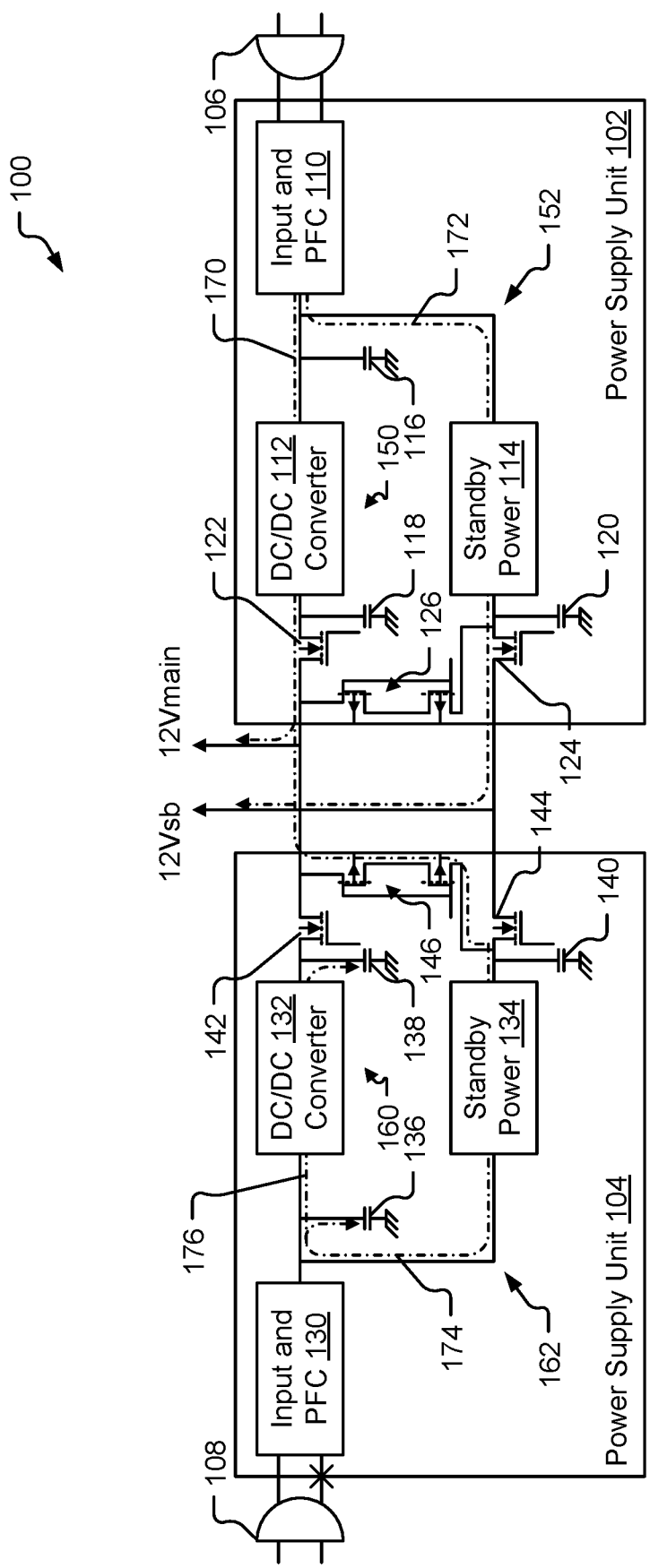
FIG. 2 is a schematic and block diagram of a dual power supply system in which charging energy comes from a main power rail via the standby power circuitry when one of power supply units input voltage is lost according to another embodiment of the present disclosure.
Figure 4:
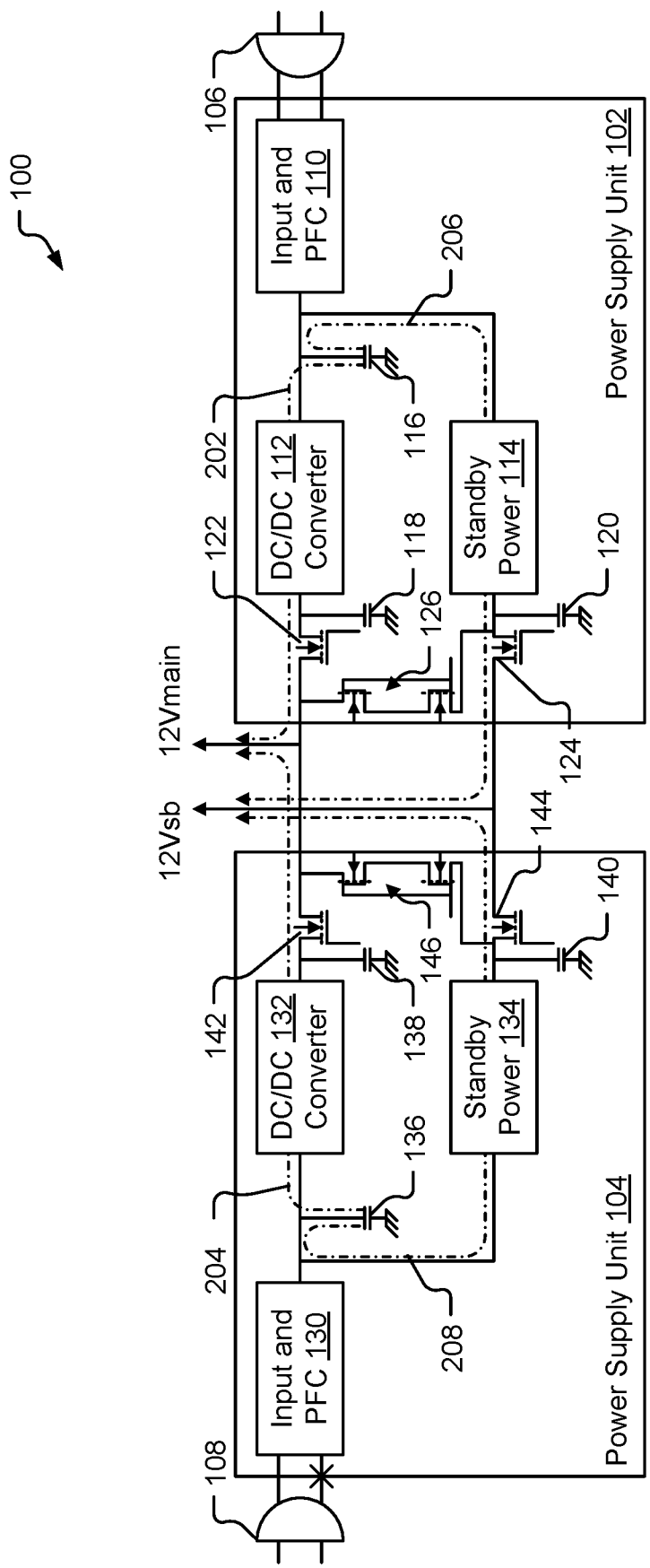
FIG. 4 is a schematic and block diagram of the dual power supply system in which all power supply units support hold up time when all power supply units input voltages are lost according to another embodiment of the present disclosure.

The power supply unit 102 includes a main power branch 150 to provide the main output voltage at the output terminal, 12Vmain, and a standby power branch 152 to provide voltage to standby voltage at the output terminal, 12Vsb. The main power branch 150 includes the input and power factor correction circuitry 110, the DC/DC converter 112, the capacitors 116 and 118, and the or'ing transistor 122. In FIGS. 2 and 4, the power supply unit 102 also includes transistor array 126, which includes two transistors connected in series via a second current electrode of a first transistor being coupled to a first current electrode of a second transistor with the control terminals of the transistors coupled together. A first current electrode of the first transistor is coupled to the main output, 12Vmain, and a second current electrode of the second transistor is coupled to the first terminal of capacitor 120. In FIGS. 2 and 4, the power supply unit 104 also includes transistor array 146, which includes two transistors connected in series via a second current electrode of a first transistor being coupled to a first current electrode of a second transistor with the control terminals of the transistors coupled together. A first current electrode of the first transistor is coupled to the standby output, 12Vsb, and a second current electrode of the second transistor is coupled to the first terminal of capacitor 140.

During normal operation, both of the power supply units 104 and 106 can have a hold up time 10 ms. In this situation, if both input voltage sources 106 and 108 are off, the power supply units 102 and 104 can provide a total of 20 ms of up time. Any one of the AC input voltages 106 or 108 is lost, the remaining respective power supply unit 104 or 102 is alive so system hold up is reduced to 10 mS. In an embodiment, the capacitors 116 and 136 can be bulk capacitors that can be charged to hold a voltage capable of providing the hold up voltage in response to the input voltage sources 106 and 108 being off to maintain 20 ms hold up time.

While AC input voltage sources 106 and 108 are both on, the output voltage can be provided from both power supply unit 102 and 104 equally, which relies on power supply current sharing design. FIGS. 1 and 2 show that if the input voltage source 108 is turned off, such as by failure, the power supply unit 102 can continue to provide the output voltage to the output voltage terminal, 12Vmain, as shown by arrow 170. The power supply unit 102 can also provide the standby power to the output terminal, 12Vsb, as shown by arrow 172. The power supply unit 104 can enter a reverse charging mode, so that the capacitor 136 can be charged to a predetermined voltage.

While the power supply unit 104 is in the reverse charging mode, the standby power circuitry 134 can be disabled from providing a voltage to the standby output terminal, 12Vsb, but instead allow energy from power supply unit 102 to charge capacitor 136 as shown by arrow 174. In an embodiment, current can be provided to the capacitor 136 via the standby power circuitries 114 and 134 based on transistors 124 and 144 or via the main power circuitries 112 and 132 based on transistor arrays 126 and 146, as shown in FIG. 2, being closed. The capacitor 136 can be charged to a predetermined voltage, such as 400 V. Once the capacitor 136 is charged to the determined voltage level, the capacitor 136, the bulk capacitor of power supply unit 104, can still get energy from the power supply unit 102, the alive power supply unit to cover power consumption of power supply unit 104, such that the capacitor 136 and DC/DC converter 132 can stay in a hot spare mode. In an embodiment, the capacitor 138 can also be charged as shown by arrow 176. In the hot spare mode, the DC/DC converter 132 provides slight lower voltage than 12Vmain so no energy is provided to 12Vmain rail by the DC/DC converter 132. The lower voltage provided by the DC/DC converter 132 can result in transistor 142 being off. In an embodiment, energy utilized to charge capacitor 136 can be limited so that the standby power of power supply unit 102 is working properly. Thus, the power supply unit 102 can provide a predefined amount of power, such as 2 W, to charge bulk capacitor. In an embodiment, this small energy won't impact standby power of the power supply unit 102 in normal operation. In an embodiment, the charge energy can be increased and it is dependent on standby maximum power and system required standby power. In one embodiment, the charge energy can be provided from main output, 12Vmain as shown in FIG. 2, via transistor array 146. In this embodiment, the charge time can be reduced significantly based on the main output, 12Vmain, providing a high charge energy. In an embodiment, the main DC/DC converter reversed charging scheme may bring some concerns, such as bulk voltage isn't maintain at higher level, response time is lower, or the like, based on the DC/DC converter swapping operation in reversed charging mode and hot spare mode back and forth frequently.

Figure 3:
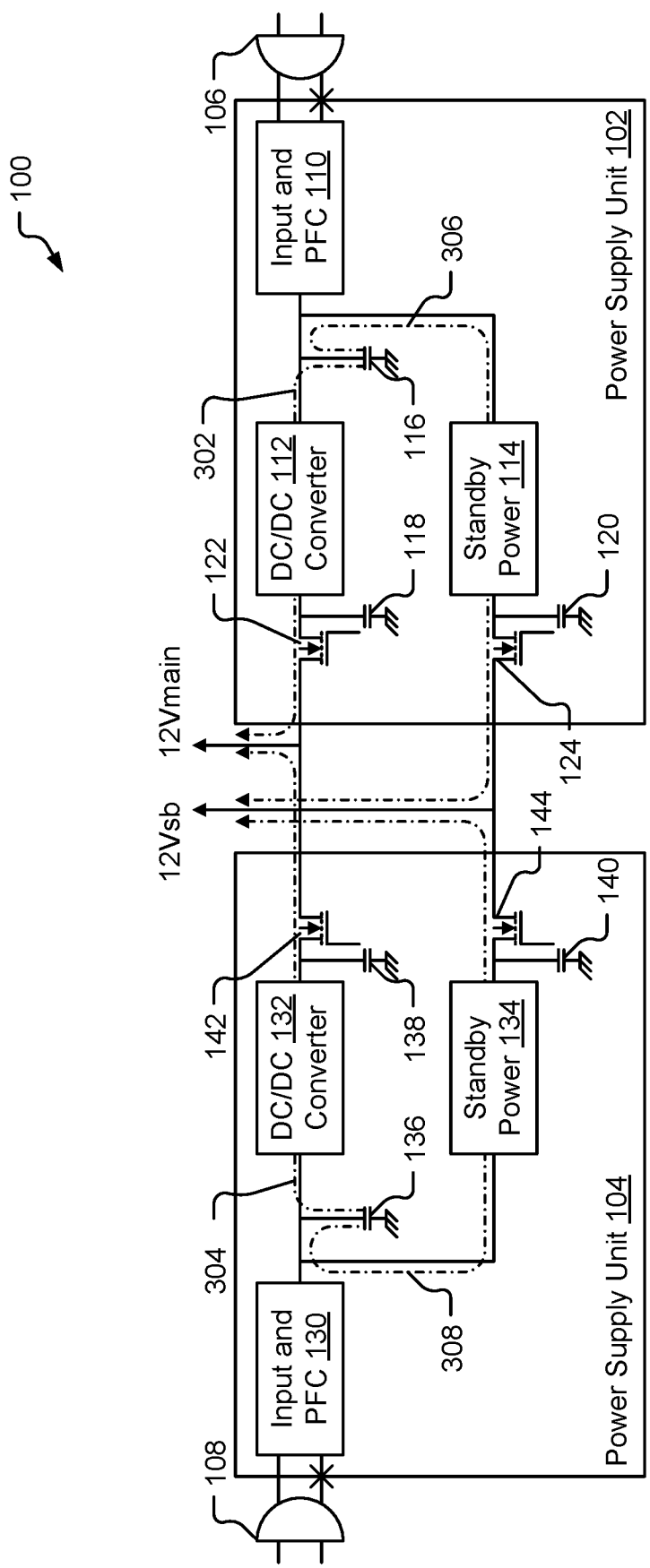
FIG. 3 is a schematic and block diagram of the dual power supply system in which all power supply units support hold up time when all power supply units input voltages are lost according to at least one embodiment of the present disclosure.

FIG. 3 illustrates the dual power supply system 100 including the power supply units 102 and 104 according to at least one embodiment of the present disclosure. As shown in FIG. 3, while the AC input voltage source 108 is lost, the AC input voltage source 106 is turn off/fail. In response to the failure of both input sources 106 and 108 and a determination that the voltage at the output voltage terminal, 12Vmain, has dropped below a threshold voltage level, the bulk capacitors 116 and 136 can provide both the main voltage output and the standby voltage output in a hold up mode of operation.

After both input voltage sources 106 and 108 are off, the hot spare power supply unit 102 can start to deliver system current with power supply unit 104 via arrow 304, while 12Vmain falls below specified voltage. Meanwhile the standby power circuitry 134 stop the reversed charging mode and can return to normal mode operation to share/provide standby power with power units 104 via arrow 308.

Figure 5:
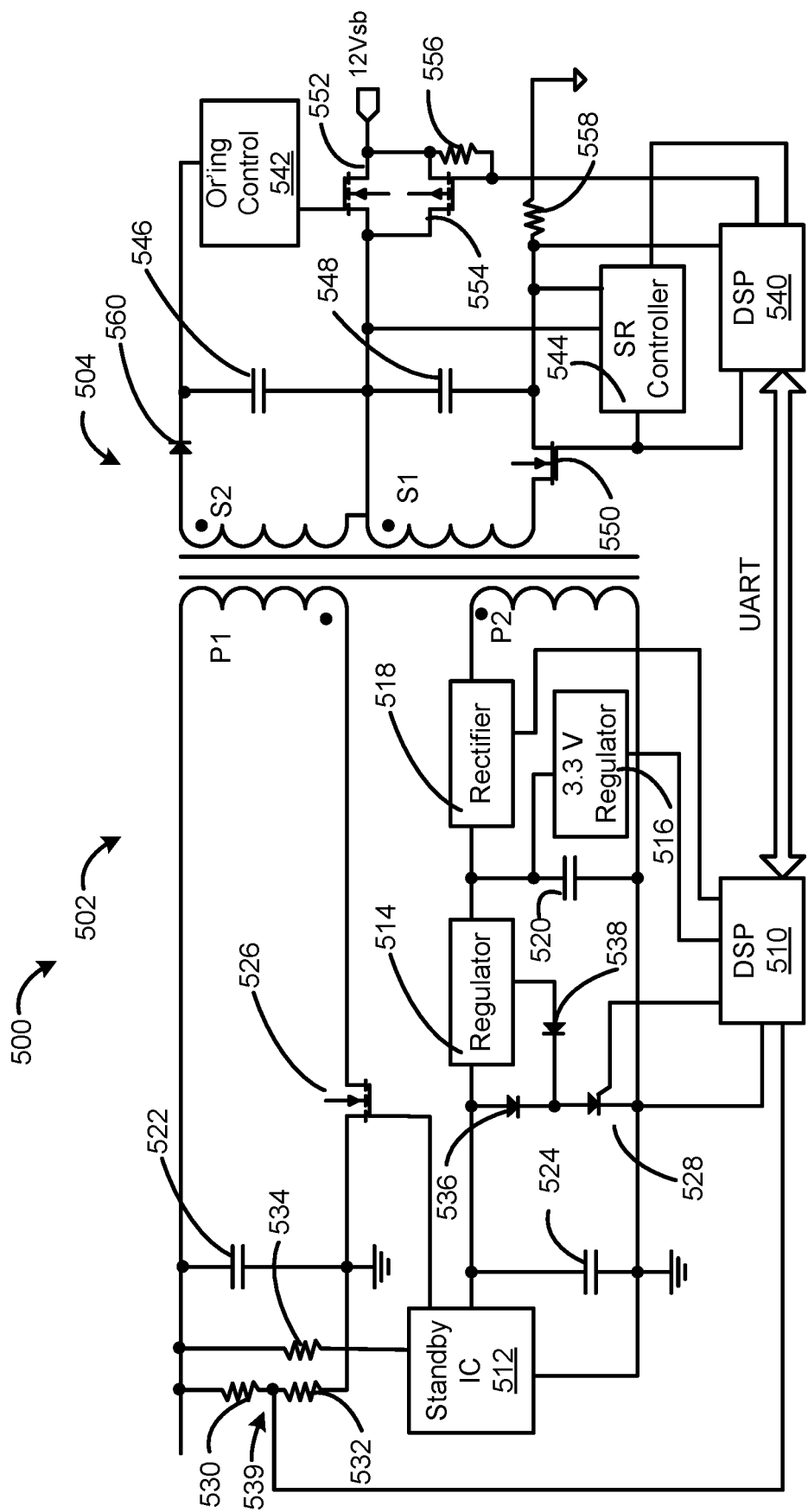
FIG. 5 is a schematic and block diagram of an embodiment of a portion of the dual power supply system according to at least one embodiment of the present disclosure.

FIG. 5 is a schematic and block diagram of an embodiment of standby circuitry 500, which corresponds to standby circuitry 114 and 134 of FIGS. 1, 2, 3, and 4, according to at least one embodiment of the present disclosure. The standby circuitry 500 includes a primary side 502 and a second side 504. The primary side includes a digital signal processor (DSP) 510, a standby integrated circuit (IC) 512, regulators 514 and 516, a rectifier 518, capacitors 520, 522, and 524, transistors 526, and SCR transistor 528, resistors 530, 532, and 534, and diodes 536 and 538. The secondary side includes a DSP 540, or'ing control circuitry 542, a SR controller 544, capacitors 546 and 548, transistors 550, 552, and 554, and resistors 556 and 558. In an embodiment, the SCR transistor 528 is composed of transistors, resistors, and the like to lower hold current than traditional SCR.

The DSP 510 includes first, second, third, fourth, fifth, and sixth terminals. The standby IC 512 includes first, second, third, and fourth terminals. In different embodiments, the DSP 510 and standby IC 512 include more terminals. The regulator 514 includes a first terminal coupled to the third terminal of the standby IC 512, and second and third terminals. The regulator 516 includes a first terminal coupled to the second terminal of the regulator 514, and a second terminal coupled to fourth terminal of the DSP 510. The rectifier 518 includes a first terminal coupled to the second terminal of the regulator 514, a second terminal coupled to a first terminal of a second primary winding P2 of the primary side, and a third terminal coupled to fifth terminal of the DSP 510.

The capacitor 520 includes a first terminal coupled to the second terminal of the regulator 514, and a second terminal coupled to a second terminal of the second primary winding P2. The capacitor 522 includes a first terminal coupled to a first terminal of a first primary winding P1 of the primary side, and a second terminal coupled to ground. The capacitor 524 includes a first terminal coupled to the third terminal of the standby IC 512, and a second terminal the second terminal of the second primary winding P2.

The transistor 526 includes a first current electrode coupled to the second terminal of the capacitor 522, a second current electrode coupled to a second terminal of the first primary winding P1, and a control terminal coupled to the second terminal of the standby IC 512. The SCR transistor 528 includes a first current electrode, a second current electrode coupled to the ground, and a control terminal coupled to the third terminal of the DSP 510.

The resistor 530 includes a first terminal coupled to the first terminal of the first primary winding P1, and a second terminal coupled to the first terminal of the DSP 510. The resistor 532 includes a first terminal coupled to the first terminal of the DSP 510, and a second terminal coupled to the first current electrode of the transistor 526. The resistor 534 includes a first terminal coupled to the first terminal of the first primary winding P1, and a second terminal coupled to the first terminal of the standby IC 512. The diode 536 includes a first terminal coupled to the first terminal of the regulator 514, and a second terminal coupled to the first current electrode of the SCR transistor 528. The diode 538 includes a first terminal coupled to the third terminal of the regulator 514, and a second terminal coupled to the first current electrode of the SCR transistor 528.

The DSP 540 includes a first terminal coupled to the sixth terminal of the DSP 510 via UART, which is composed of photo-coupler, resistors, capacitors, and the like. DSP 540 also includes second, third, and fourth terminals, and fifth terminal coupled to fourth terminal of SR controller 544. The or'ing control circuitry 542 includes first and second terminals. The SR controller 544 includes a first terminal coupled to the second terminal of the DSP 540 and control terminal of transistor 550, a second terminal coupled to a first terminal of capacitor 548, a third terminal coupled to a second terminal capacitor 548, and a fourth terminal coupled to fifth terminal of DSP 540.

The capacitor 546 includes a first terminal coupled to the first terminal of the or'ing control circuitry 542, and a second terminal. The capacitor 548 includes the first terminal coupled to the second terminal of the capacitor 546, and the second terminal coupled to the third terminal of the SR controller 544.

The transistor 550 includes a first current electrode coupled to a second terminal of a first secondary winding S1, a second current electrode coupled to the second terminal of the capacitor 548, and a control terminal coupled to the second terminal of the DSP 540. The transistor 552 includes a first current electrode, a second terminal of a second secondary winding S2 and to a first terminal of the first secondary winding S1, a second current electrode coupled to the standby output terminal, 12Vsb, and a control terminal coupled to the second terminal of the or'ing control circuitry 542. The transistor 554 includes a first current electrode a second terminal of a second secondary winding S2 and to a first terminal of the first secondary winding S1, a second current electrode coupled to the standby output terminal, 12Vsb, and a control terminal coupled to the fourth terminal of the DSP 540.

The resistor 556 includes a first terminal coupled to the control terminal of the transistor 554, and a second terminal coupled to the control electrode of the transistor 552 and to the voltage terminal, 12Vsb. The resistor 558 includes a first terminal coupled to the second current electrode of the transistor 550, and a second terminal coupled to the ground. The diode 560 includes a first terminal coupled to a first terminal of the second secondary winding S2, and a second terminal coupled to the first terminal of the capacitor 546.

During operation, the DSPs 510 and 540 control the components of the standby power circuitry 500 to place the standby power circuitry 500 in one of: the normal mode of operation, the reverse charging mode of operation, and the hot spare mode of operation. In an embodiment, the capacitor 522 can correspond to the capacitor 116 or 136 of FIGS. 1, 2, 3, and 4. The DSPs 510 and 540 can also prevent the AC input voltage for either power supply unit 102 or 104 of FIG. 1 from resuming while the respective power supply unit is in the reverse charging mode as will be described below.

In an embodiment, if AC input source and standby are powered off, then capacitors 548, 524, 534 and 520 do not have a voltage across them. In this embodiment, DSP 510 can be off and has no communication with DSP 540 via the communication bus. In an embodiment, the communication bus can be a universal asynchronous receiver/transmitter (UART) bus, or the like. When standby power works reversely, in response to the DSP 510 being off, the or'ing control circuitry 542 can activate the transistor 552 by getting a voltage from voltage terminal, 12Vsb. In an embodiment, the transistor 552 can be referred to as an or'ing transistor. In response to the transistor 552 being activated current can flow through capacitor 548. Once transistor 550 turn on and turn off in turn, the first secondary winding S1 can induce a current on the second primary winding P2 and this induced current can be utilized by the rectifier 518 to charge the capacitor 520. The first primary winding P1 does not induce current because it is blocked by transistor 526 when transistor 550 is turned on, and it will charge capacitor 522 when transistor 550 is turned off. The transistor 554 can also be activated by the DSP 540 to provide an additional bypass for low current applications. In an embodiment, the transistor 554 can be a P type MOSFET transistor with a simple drive design.

When standby power is operating reversed charging mode to charge bulk capacitor 522, the DSP 540 can then send a pulse width modulate (PWM) signal to switch transistor 550 on or off In an embodiment, the capacitor 522 is charging based on current induced on the primary side windings P1 and P2 from the secondary side windings S1 when the transistor 550 is turned off by the PWM signal, and the capacitor 520 is charging based when transistor is turned on by the PWM signal. When the DSP 510 has the bias voltage from capacitor 520, the DPS 510 can determine whether the AC input voltage source has been restored. If the AC input voltage source has been restored, the DSP 510 can stop reverse charging operation and can return the power supply unit to normal operation. In an embodiment, a slow detection of the AC input voltage source being restored by the DSP 510 is enough to control the mode transition safely from reverse charging to normal operation based on the protection of device photo coupler 602 and SCR transistor 528.

In an embodiment, the reverse charging operation can take about 80 seconds which is dependent on the capacitance of the capacitor 522, since a current limit protection is provided by the DSP 540 monitoring the current through resistor 558 to decide supported charging energy, to charge the capacitor 522 to a predetermined voltage level, such as 400V. Once the predetermined voltage level is reached, DSP 540 can enable a DC/DC converter, such as DC/DC converter 112 or 132, in a burst mode operation or hot spare mode. While in the hot spare mode, the DC/DC converter can maintain a 12Vmain internal voltage slight lower than 12Vmain. In this situation, transistor 552 can be turned off and only a small amount of power consumption, such as 1 W, can maintain the capacitor 522 at the predetermined voltage level. Meanwhile, DSP 510 can receive a feedback voltage level from voltage divider 539, formed between resistors 530 and 532, and can provided the feedback voltage level to DSP 540 via DSP 510. The DSP 540 can utilize the feedback voltage level to determine if standby power should delivery energy to capacitor 522 so its voltage will be maintained at the predetermined voltage level.

In an embodiment, the PWM signal from DSP 540 to the transistor 550 can be a reverse charging operation control signal, which can be either fixed frequency and duty cycle variable, or variable frequency and fixed on time. The PWM signal can be based on an energy formula $0.5 \times L \times (\Delta I)^2 \times f$. In a variable frequency design, the switching current can be kept in a fixed rating, $\Delta I = (12V_{sb} \times T_{on\_fixed}) \div L_{lk}$, and the switching current will not impact the power standby circuitry of the power supply unit still in normal operation. In a relatively low standby power application, a variable frequency can be utilized to keep low current to the transistor 550.

In an embodiment, the SCR transistor 528 can be utilized to prevent damage to the power supply unit when the AC input voltage source recovers. In particular, the DSP 510 can activate the SCR transistor 528 to set the working voltage of the standby IC 512 to ground, which in turn shutoffs the standby IC 512, such that there is no risk when AC input is resumed.

Figure 6:
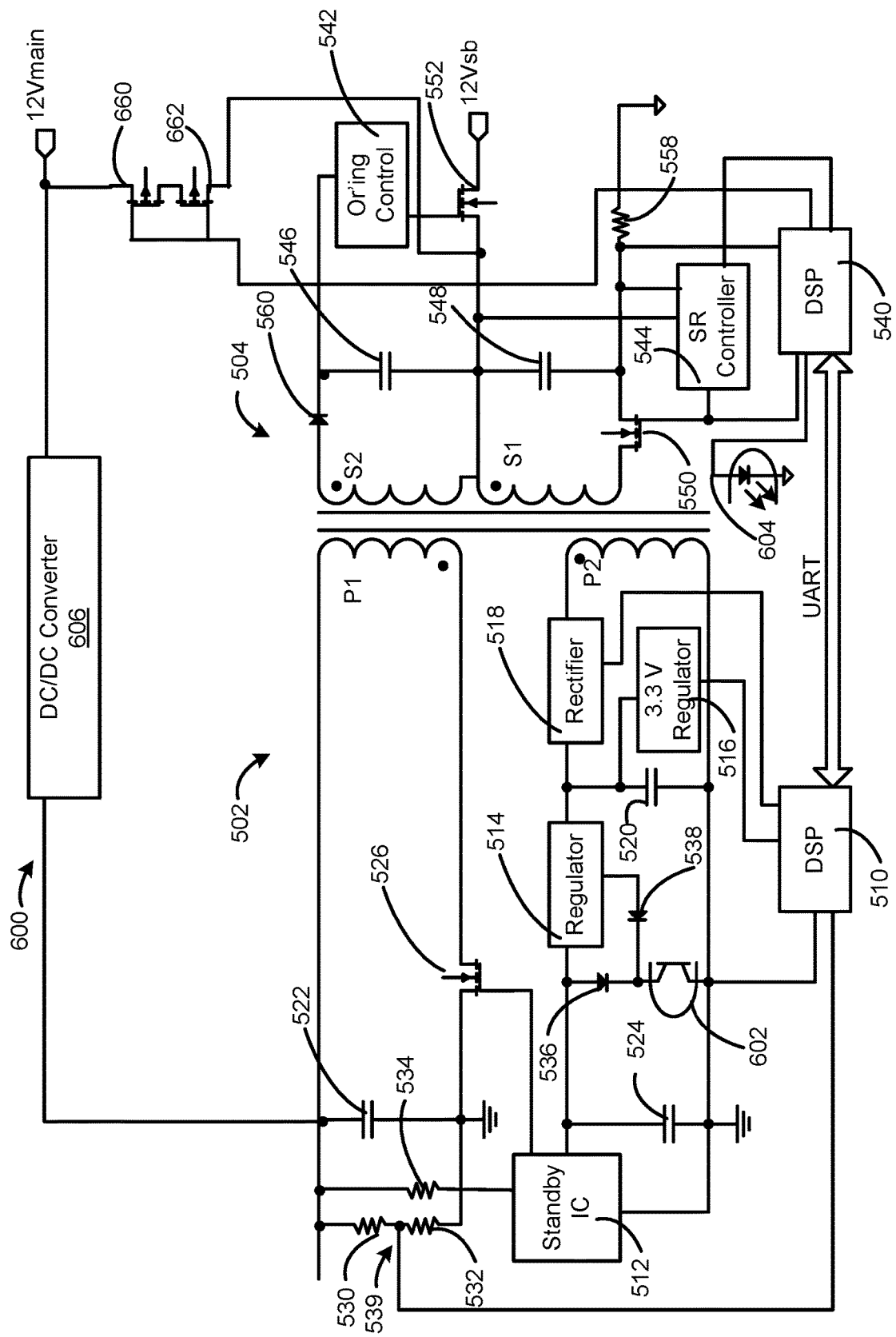
FIG. 6 is a schematic and block diagram of another embodiment of a portion of the dual power supply system according to at least one embodiment of the present disclosure.

FIG. 6 illustrates another embodiment of the standby circuitry 600 according to at least one embodiment of the present disclosure. In this embodiment, the standby circuitry 600 is the same components as described above with respect to standby circuitry 500 of FIG. 5 except that SCR transistor 528 is replaced with photo coupler 602 and the energy supported path that transistor 554 coupled to voltage terminal, 12Vsb, is replaced with transistors 660 and 662 coupled to 12Vmain and DC/DC converter 606, after the modification the charge energy is able to be increased for fast charging design. In an embodiment, the DC/DC converter 606 can be DC/DC converter 112 or 132 as shown in FIGS. 1, 2, 3, and 4. Moreover, the standby circuitry 600 operates as described above for standby circuitry 500 except that the DSP 540 can control the photo coupler 602 via the control signal 604. In this embodiment, the DSP 540 can shutoff the standby IC 512 by activating the photo coupler 602 via the control signal 604.

Figure 7:
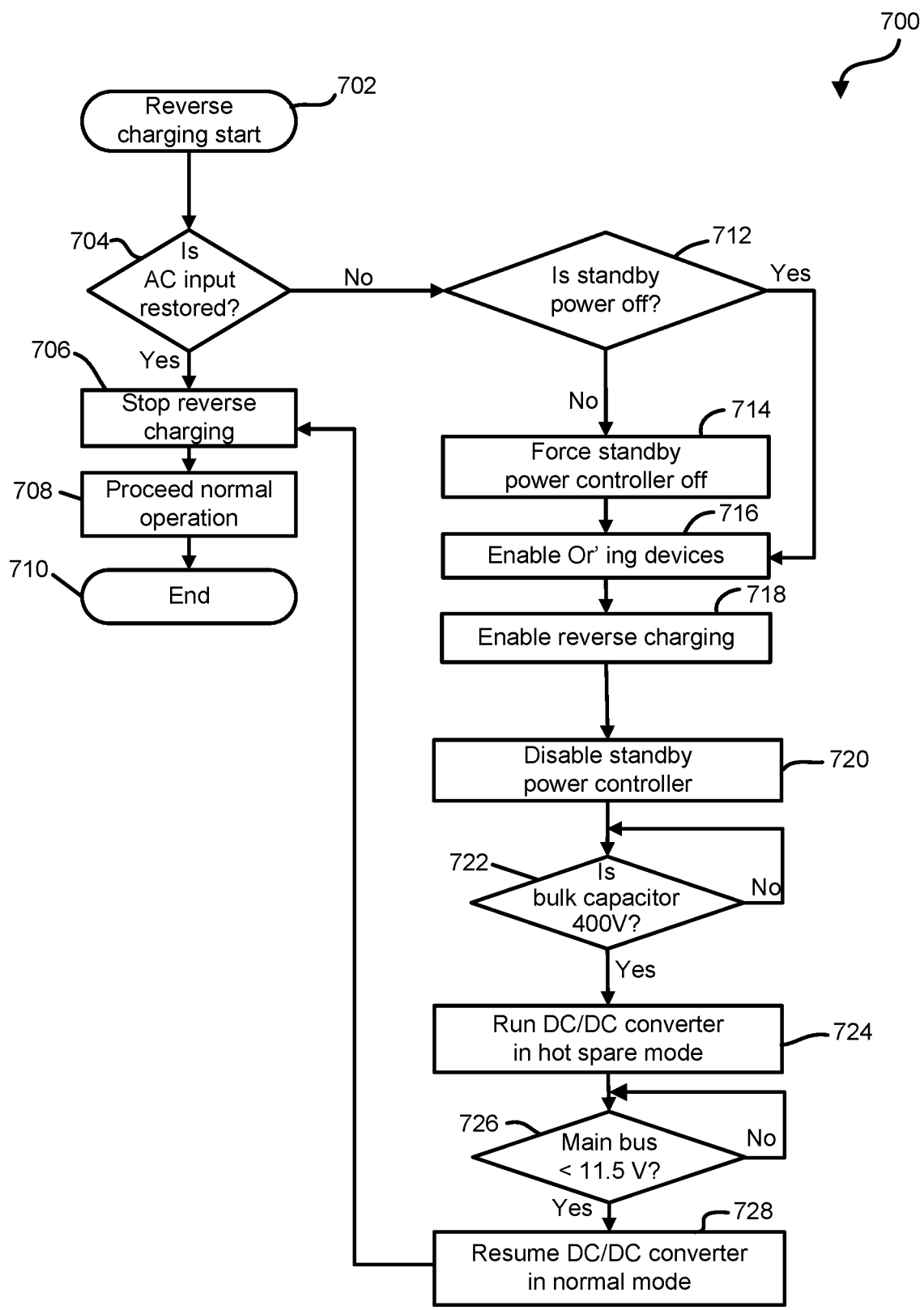
FIG. 7 is a flow diagram of a method for operating a reverse charging mode in a power supply system according to at least one embodiment of the present disclosure.

FIG. 7 illustrates a method 700 for operating a reverse charging mode in a power supply system according to at least one embodiment of the present disclosure. At block 702, the reverse charging is started. In an embodiment, a system can send a command to run the power supply system in the reverse charging mode in response to an input voltage of a power supply unit being lost. An input voltage confirmation is conducted, by a digital signal processor (DSP), to determine whether the input voltage is restored at block 704. In an embodiment, the determination of whether the input voltage is stored can be utilized by the power supply unit and/or system to decide whether to continue the reverse charging mode or to return to the normal mode of operation. In an embodiment, the input voltage can be an AC voltage.

If the input voltage is restored, the flow continues at block 706 and the reverse charging is stopped. Then the power supply system is returned to normal operation at block 708, the flow ends at block 710. Otherwise, if the input voltage is not restored, the flow continues at block 712 and a determination is made whether a standby power is off. If the standby power is off, the flow continues at block 716. However, if the standby power is not off, a standby power controller is forced off at block 714. In an embodiment, the standby power may continue to be on/working based on a bulk capacitor in the power supply unit maintaining a standby power. In an embodiment, forcing the standby controller off can protect component of the power supply unit, such as transistors within the power supply unit, during the reverse charging mode of operation. In an embodiment, the standby controller can be forced off by turning on a transistor coupled to the standby controller, which in turn can cause a working voltage of the standby controller to drop to 0V. In an embodiment, the transistor can be a composed transistor SCR, a photo coupler or the like. At block 716, or'ing devices are enabled. In an embodiment, the or'ing device can be a transistor, once it is conducted the capacitor 548 can be charged from either standby power or main power for reversed charging application. The reverse charging of a bulk capacitor is enabled at block 718. The standby power controller is disabled at block 720. At block 722, a determination is made whether a bulk capacitor is at a predetermined voltage, such as 400 V. When the bulk capacitor is at the predetermined voltage level, a DC/DC converter is run in a hot spare mode at block 724. In an embodiment, while in the hot spare mode the DC/DC converter can maintain an internal voltage at a level that is slightly lower than a main output voltage. Also, during the hot spare mode another DSP can feedback a voltage level, such as the voltage at resistor divider within the power supply unit, to the DSP to decide if standby power needs to delivery energy to bulk capacitor so its voltage will be maintained at the predetermined level.

At block 726, a determination is made whether the main output voltage has dropped below a threshold voltage level, such as 11.5 V. When the output voltage has dropped below the threshold voltage, the DC/DC converter is resumed in the normal mode of operation at block 728 to extend hold up time, and the flow continues as stated above at block 706.

Figure 8:
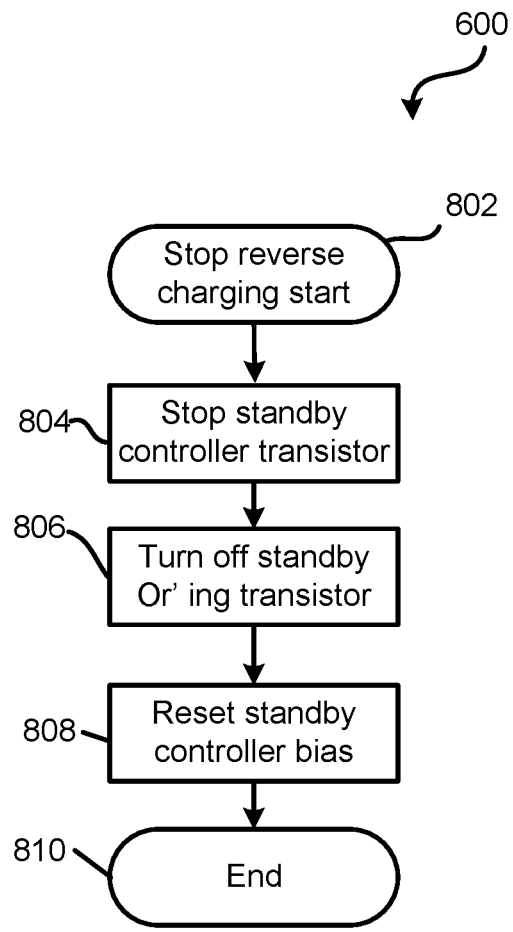
FIG. 8 is a flow diagram of a method for ending a reverse charging mode in a power supply system according to at least one embodiment of the present disclosure.

FIG. 8 illustrates a method 800 for ending a reverse charging mode in a power supply system according to at least one embodiment of the present disclosure. At block 802, the stopping of reverse charging begins. At block 804, a standby controller transistor is stopped by disabling DSP control. In an embodiment, the transistor can be controlled by SR controller. The standby or'ing transistor is turned off at block 806. At block 808, the standby controller bias input is reset. At block 810, the reverse charging mode is ended.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   detecting a loss of a first input voltage source to a first power supply unit of a multiple power supply system, the multiple power supply system including the first power supply unit and a second power supply unit;
   operating the first power supply unit in a reverse charging mode of operation in response to the loss of the first input voltage source;
   charging a bulk capacitor of the first power supply unit while in the reverse charging mode of operation;
   determining whether a voltage level of the bulk capacitor is equal to a threshold voltage level;
   providing a lower charging cycle in the reverse charging mode of operation in response to the bulk capacitor being charged to a predetermined voltage level;
   detecting a loss of a second input voltage source to the second power supply unit while the first input voltage source is lost;
   operating in a hold up mode of operation in response to the loss of the second input voltage source and the first input voltage source being lost; and
   providing an output voltage from the bulk capacitor while in the hold up mode of operation.

2. The method of claim 1 further comprising:
   determining whether a standby power integrated circuit of the second power supply unit is off while the first power supply unit is in the reverse charging mode of operation; and
   forcing the standby power integrated circuit to power off in response to determining that the standby power integrated circuit is not off.

3. The method of claim 2 wherein forcing the standby integrated circuit to power off protects components of the power supply unit while in the reverse charging mode of operation.

4. The method of claim 2 wherein forcing the standby integrated circuit to power off comprises:
   turning on a transistor coupled to the standby integrated circuit to pull a working voltage of the standby integrated circuit to ground.

5. The method of claim 1 further comprising:
   determining whether a high current is received in the first power supply unit; and
   ending the reverse charging mode for a predetermined amount of time in response to determining that the high current is received in the first power supply unit.

6. The method of claim 1 further comprising:
   operating the first power supply unit in a hot spare mode of operation in response to the reverse charging mode of operation ending and prior to resuming a normal mode of operation.

7. The method of claim 6 further comprising:
   maintaining the voltage level of the bulk capacitor at the predetermined voltage level while operating in the hot spare mode of operation.

8. A method comprising:
   detecting a loss of a first input voltage source to a first power supply unit of a multiple power supply system, the multiple power supply system including the first power supply unit and a second power supply unit;
   operating the first power supply unit in a reverse charging mode in response to the loss of the first input voltage source;
   charging a bulk capacitor of the first power supply unit while in the reverse charging mode;
   determining whether a standby power integrated circuit of the second power supply unit is off while the first power supply unit is in the reverse charging mode;
   forcing the standby power integrated circuit to power off in response to determining that the standby power integrated circuit is not off;
   determining whether a voltage level of the bulk capacitor is equal to a threshold voltage level;
   providing a lower charging cycle in the reverse charging mode in response to the bulk capacitor being charged to a predetermined voltage level;
   detecting a loss of a second input voltage source to the second power supply unit while the first input voltage source is lost;
   operating in a hold up mode in response to the loss of the second input voltage source and the first input voltage source being lost;
   providing an output voltage from the bulk capacitor while in the hold up mode; and
   operating the first power supply unit in a hot spare mode in response to the reverse charging mode ending and prior to resuming a normal mode.

9. The method of claim 8 wherein forcing the standby integrated circuit to power off protects components of the power supply unit while in the reverse charging mode.

10. The method of claim 8 wherein forcing the standby integrated circuit to power off comprises:
    turning on a transistor coupled to the standby integrated circuit to pull a working voltage of the standby integrated circuit to ground.

11. The method of claim 8 further comprising:
    determining whether a high current is received in the first power supply unit; and ending the reverse charging mode for a predetermined amount of time in response to determining that the high current is received in the first power supply unit.

12. The method of claim 8 further comprising:

maintaining the voltage level of the bulk capacitor at the predetermined voltage level while operating in the hot spare mode.

13. The method of claim 8 further comprising:

maintaining, at a direct current to direct current converter, an internal voltage at a level that is slightly lower than a main output voltage.

* * * * *